US011643587B2

(12) United States Patent
Boul et al.

(10) Patent No.: US 11,643,587 B2
(45) Date of Patent: May 9, 2023

(54) METHODS OF MAKING CEMENT SLURRIES AND CURED CEMENT AND USE THEREOF

(71) Applicant: Saudi Arabian Oil Company, Dhahran (SA)

(72) Inventors: Peter J. Boul, Houston, TX (US); Ashok Santra, The Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 468 days.

(21) Appl. No.: 16/993,687

(22) Filed: Aug. 14, 2020

(65) Prior Publication Data

US 2021/0047556 A1   Feb. 18, 2021

Related U.S. Application Data

(60) Provisional application No. 62/887,817, filed on Aug. 16, 2019.

(51) Int. Cl.
| | |
|---|---|
| *C09K 8/467* | (2006.01) |
| *C04B 14/02* | (2006.01) |
| *C04B 14/04* | (2006.01) |
| *C04B 20/10* | (2006.01) |
| *C04B 28/02* | (2006.01) |
| *C04B 103/00* | (2006.01) |
| *C04B 103/40* | (2006.01) |
| *C04B 24/26* | (2006.01) |

(52) U.S. Cl.
CPC ............ *C09K 8/467* (2013.01); *C04B 14/026* (2013.01); *C04B 14/04* (2013.01); *C04B 20/1055* (2013.01); *C04B 24/2647* (2013.01); *C04B 28/02* (2013.01); *C04B 2103/0073* (2013.01); *C04B 2103/408* (2013.01); *C09K 2208/10* (2013.01)

(58) Field of Classification Search
CPC .. C09K 8/467; C09K 2208/10; C04B 14/026; C04B 14/04; C04B 20/1055; C04B 24/2647; C04B 28/02; C04B 28/04; C04B 2103/0073; C04B 2103/408; C04B 2208/10; C04B 2111/94

See application file for complete search history.

(56) References Cited

U.S. PATENT DOCUMENTS

| | | | |
|---|---|---|---|
| 7,712,527 B2 | 5/2010 | Roddy | |
| 7,947,773 B2 | 5/2011 | Hansen et al. | |
| 8,024,749 B2 | 9/2011 | Sasaoka et al. | |
| 8,038,908 B2 | 10/2011 | Hirai et al. | |
| 8,168,291 B2 | 5/2012 | Shah et al. | |
| 8,324,487 B2 | 12/2012 | Shen et al. | |
| 8,337,979 B2 | 12/2012 | Wardle et al. | |
| 8,739,876 B2 | 6/2014 | Saini et al. | |
| 8,763,695 B2 | 7/2014 | van Zanten | |
| 8,865,107 B2 | 10/2014 | Hersam et al. | |
| 9,045,343 B2 | 6/2015 | Raney et al. | |
| 9,085,487 B2 | 7/2015 | Eleto Da Silva et al. | |
| 9,365,456 B2 | 6/2016 | Shah et al. | |
| 9,797,937 B2 | 10/2017 | Mo et al. | |
| 2008/0134942 A1 | 6/2008 | Brenner et al. | |
| 2008/0176071 A1 | 7/2008 | Choi et al. | |
| 2009/0229494 A1* | 9/2009 | Shah ..................... C04B 28/04 106/816 |
| 2010/0045311 A1 | 2/2010 | Chung | |
| 2011/0089958 A1 | 4/2011 | Malecki et al. | |
| 2011/0124483 A1* | 5/2011 | Shah ..................... C04B 35/584 252/502 |
| 2012/0028798 A1* | 2/2012 | Worsley ................. B82Y 40/00 252/502 |
| 2012/0238021 A1 | 9/2012 | Hashim et al. | |
| 2014/0090842 A1 | 4/2014 | Patil et al. | |
| 2014/0318783 A1 | 10/2014 | Martin et al. | |
| 2015/0141304 A1 | 5/2015 | Davidson et al. | |
| 2015/0361760 A1 | 12/2015 | McClung, III | |
| 2016/0258269 A1 | 9/2016 | Musso et al. | |
| 2018/0209951 A1 | 7/2018 | Vipulanandan | |

FOREIGN PATENT DOCUMENTS

| | | |
|---|---|---|
| CN | 102275899 A | 12/2011 |
| CN | 105268339 A | 1/2016 |
| EP | 3744699 A1 | 12/2020 |
| WO | 2011128615 A1 | 10/2011 |
| WO | 2012057910 A2 | 5/2012 |
| WO | 2013116227 A1 | 8/2013 |

(Continued)

OTHER PUBLICATIONS

Azhari et al., "Cement-based sensors with carbon fibers and carbon nanotubes for piezoresistive sensing", Cement & Concrete Composites, vol. 24, pp. 866-873, 2012.
He et al., "Design of Electrically Conductive Structural Composites by Modulating Aligned CVD-Grown Carbon Nanotube Length on Glass Fibers", ACS Applied Materials & Interfaces, Washington,D. C., American Chemical Society, vol. 9, No. 3, pp. 2948-2958, 2017.
Konsta-Gdoutos et al., "Fresh and mechanical properties, and strain sensing of nanomodified cement mortars: The effects of MWCNT aspect ration, density and functionalization", Cement and Concrete Composites, vol. 82, pp. 137-151, 2017.
Korayem et al., "A review of dispersion of nanoparticles in cementitious matrices: Nanoparticle geometry perspective", Construction and Building Materials, vol. 153, pp. 346-357, 2017.
Luo et al., "Piezoresistive properties of cement composites reinforced by functionalized carbon nanotubes using photo-assisted fenton", Smart Materials and Structures, Apr. 2017, 21 pgs.

(Continued)

*Primary Examiner* — Aiqun Li
(74) *Attorney, Agent, or Firm* — Dinsmore & Shohl LLP

(57) ABSTRACT

Cured cements, cement slurries, and methods of making cured cement and methods of using cement slurries are provided. The method of making a modified cement slurry includes adding particles comprising carbon nanotube sponges disposed on sacrificial templates to a cement slurry to form the modified cement slurry and allowing the sacrificial templates to disintegrate, thereby leaving the carbon nanotube sponges dispersed throughout the modified cement slurry.

20 Claims, No Drawings

(56) References Cited

FOREIGN PATENT DOCUMENTS

| WO | 2014204517 A2 | 12/2014 |
| WO | 2018048569 A1 | 3/2018 |
| WO | 2018101545 A1 | 6/2018 |

OTHER PUBLICATIONS

Sharma et al., "Synergistic effect of zero-dimensional spherical carbon nanoparticles and one-dimensional carbon nanotubes on properties of dement-based ceramic matrix: microstructural perspectives and crystallization investigations", Instrumentation Science & Technology, vol. 22, No. 9, ppl. 899-921, 2015.

Tehrani et al., "Hybrid carbon fiber/carbon nanotube composites for structural damping applications", Nanotechnology, vol. 24, Mar. 2013.

Ubertini et al., "Recent Advances on SHM of Reinforced Concrete and Masonry Structures Enabled by Self-Sensing Structural Materials", Proceedings, vol. 1, No. 119, Nov. 14, 2017, 6 pgs.

U.S. Notice of Allowance and Fee(s) Due dated Dec. 1, 2021 pertaining to U.S. Appl. No. 16/993,734, filed Aug. 14, 2020, 14 pages.

International Search Report and Written Opinion dated Nov. 12, 2020 pertaining to International application No. PCT/US2020/046371 filed Aug. 14, 2020, 13 pgs.

International Search Report and Written Opinion dated Nov. 12, 2020 pertaining to International application No. PCT/US2020/046337 filed Aug. 14, 2020, 13 pgs.

U.S. Office Action dated Aug. 5, 2021 pertaining to U.S. Appl. No. 16/993,734, filed Aug. 14, 2020, 22 pages.

Examination Report dated Aug. 29, 2021 pertaining to GCC application No. 2020-40286 filed Aug. 16, 2020.

\* cited by examiner

METHODS OF MAKING CEMENT SLURRIES AND CURED CEMENT AND USE THEREOF

CROSS-REFERENCE TO RELATED APPLICATIONS

This application claims the benefit of U.S. Provisional Application Ser. No. 62/887,817 filed Aug. 16, 2019, the entire disclosure of which is hereby incorporated herein by reference.

TECHNICAL FIELD

Embodiments of the present disclosure generally relate to cement slurries and methods of making and using cement slurries and to cured cements and methods of making cured cement.

BACKGROUND

Cement slurries are used in the oil and gas industries, such as for cementing in oil and gas wells. Primary, remedial, squeeze, and plug cementing techniques can be used to place cement sheaths in an annulus between casing and well formations, for well repairs, well stability, or for well abandonment (sealing an old well to eliminate safety hazards). These cement slurries must be able to consistently perform over a wide range of temperatures and conditions, as cured cement in an oil and gas well may be vulnerable to cyclic stresses imposed by pressure and temperature fluctuations. Cured cement may crack and break under these stresses, reducing the integrity of the wellbore.

SUMMARY

Well integrity is conventionally monitored through the use of logs, pressure testing. Cracks or breaks in the cement may decrease the amount of product produced, may increase lost circulation, and may reduce the ability to properly shut in the wellbore, increasing the possibility of a well control event. Therefore, monitoring well integrity is critical to efficient and effective productivity. Downhole sensors have been proposed as essential means to monitor sealant structural health to estimate degradation of the sealant sheath and the likelihood of zonal isolation loss. In order to monitor downhole stresses, a tailored cement to enhance the piezoresponse from the cement sheath in the wellbore annulus can be produced. Disposing carbon nanotube sponges within the cement may further enhance the electrical conductivity of the cement.

Accordingly, there is an ongoing need for cement slurries that have increased electrical conductivity as compared to conventional cement slurries. The present embodiments address these needs by providing methods of making modified cement slurries with carbon nanotube sponges dispersed throughout the modified cement slurries.

In one embodiment, a method of making a modified cement slurry is disclosed, including adding particles including carbon nanotube sponges disposed on sacrificial templates to a cement slurry to form the modified cement slurry; and allowing the sacrificial templates to disintegrate, thereby leaving the carbon nanotube sponges dispersed throughout the modified cement slurry.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "carbon nanotube sponges" refers to a three dimensional interconnected framework of carbon nanotubes. The carbon nanotube sponges are synthesized via chemical vapor deposition, in which the carbon nanotubes are self-assembled into the three dimensional interconnected framework.

As used throughout this disclosure, the term "cement slurry" refers to a composition including a cement precursor that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these.

As used throughout this disclosure, the term "conductive fibers" refers to any substance with an aspect ratio of greater than 1 that is capable of conducting electrical current.

As used throughout this disclosure, "curing" refers to providing adequate moisture, temperature and time to allow the concrete to achieve the desired properties (such as hardness) for its intended use through one or more reactions between the water and the cement precursor material.

As used throughout this disclosure, "drying" refers to merely allowing the cement to achieve a moisture condition appropriate for its intended use, which may only involve physical state changes, as opposed to chemical reactions.

As used throughout this disclosure, "inversion symmetry" refers to a property of crystal structure mediums which contain an inversion center, meaning that for every point (x, y, z) in the unit cell, there is an indistinguishable point (−x, −y, −z).

As used throughout this disclosure, the term "piezoresponse" refers to the change in electrical properties a substance exhibits in response to mechanical force.

As used throughout this disclosure, the term "retarder" refers to a chemical agent used to increase the thickening time of cement slurries to enable proper placement of the cement slurry within the wellbore. The need for cement retardation increases with depth due to the greater time required to complete the cementing operation and the effect of increased temperature on the cement-setting process.

As used throughout this disclosure, the term "sacrificial template" refers to the supports on which the carbon nanotube sponges are disposed. The sacrificial templates may include at least one of silica, polylactic acid, glass, and polygluconic acid.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "unit cell" refers to the smallest repeating unit having the full symmetry of the crystal structure.

As used throughout this disclosure, the term "wellbore" refers to the drilled hole or borehole, including the openhole or uncased portion of the well. Borehole may refer to the inside diameter of the wellbore wall, the rock face that bounds the drilled hole.

Embodiments of the present disclosure relate to cement slurries with improved elasticity and self-healing capabilities. Embodiments of the present disclosure also relate to methods of producing and using cement slurries, in some particular embodiments, for use in the oil and gas industries.

Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cured cement maintains integrity and isolates the wellbore from the surrounding subsurface formations. If the cement cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid loss from the wellbore into the surrounding subsurface formation, or in decreased wellbore pressure, possibly leading to a well control event. Therefore, wellbore integrity and isolation are critical to efficient production and use of a wellbore. Wellbore integrity may be monitored through the use of sensors distributed throughout the wellbore. However, the use of conventional electrical connections to connect these sensors to the surface, such as a continuous fiber optic cable, provides a potential fluid communication pathway between subsurface formations. Furthermore, the use of such conventional electrical connections interrupts the continuity of the cement sheath and may contribute to cracks or fractures in the cement.

The present disclosure provides cured cements which may have, among other attributes, improved piezoresponse to address these concerns. Specifically, the cured cements disclosed in this application has increased electrical conductivity, and decreased bulk resistance, as compared to conventional cured cements. Furthermore, the cured cement disclosed in this application has increased electrical conductivity, and decreased bulk resistance, when a mechanical force is applied to the cured cement, as compared to the cured cement when no mechanical force is applied.

The cured cement may include cement, carbon nanotube sponges dispersed throughout the cement, and conductive fibers disposed within the cement, in which the conductive fibers interconnect the carbon nanotube sponges and form a conductive web within the cured cement. The cement may be hydraulic or non-hydraulic, depending on the cement precursor used to form the cement. Furthermore, the cement may include at least one of Portland cement, siliceous fly ash, calcareous fly ash, slag cement, silica fume, calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), calcium aluminate, and combinations of these. The cured cement may further include at least one of a dispersing agent or a surfactant, as previously described. The cured cement may include one or more of any additive previously described. In some embodiments, the dispersing agent includes polycarboxylate ether (such as a copolymer of (meth)acrylate, (meth)acryl sulfonate, and monoacrylate ester of polyethylene glycol alkyl ether or monoacrylate ester of polypropylene glycol alkyl ether). Other dispersants which may be used are sulfonated polymers (such as sulfonated lignin, sulfonated isobutylene maleic anhydride copolymers, sulfonated polystyrene-maleic anhydride), sulfonated alkylketone amine condensation products (such as acetone-melamine condensates) and sulfonated aromatic-formaldehyde condensation products (such as melamine-formaldehyde condensates, sulfonated naphthalene-formaldehyde condensates, and sulfonated phenol-formaldehyde condensates).

The surfactant may include at least one of anionic surfactants (such as sodium dodecyl sulfate, sodium benzene-dodecyl sulfonate, lignin sulfonate, and sodium stearate), cationic surfactants (such as cetrimonium bromide and benzalkonium chloride), amphoteric surfactants, zwitterionic surfactants (such as cocamidopropyl hydroxysultaine and cocamidopropyl betaine), nonionic surfactants (such as Triton™ X-100 available from Sigma-Alrich® and pentaethylene glycol monodecyl ether), or combinations of these.

In one embodiment, the silicates phase in cement may be about 75-80% of the total material. $Ca_3O_5Si$ is the major constituent, with concentration as great as 60-65%. The quantity of $Ca_2SiO_4$ conventionally does not exceed 20%, 30% or 40%. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate commonly called CSH gel has a variable C:S and H:S ratio depending on the temperature, calcium concentration in the aqueous phase, and the curing time. The CSH gel includes +/−70% of fully hydrated Portland cement at ambient conditions and is considered the principal binder of hardened cement. Upon contact with water, the gypsum may partially dissolve releasing calcium and sulphate ions to react with the aluminate and hydroxyl ions produced by the $C_3A$ to form a calcium trisulphoaluminate hydrate, known as the mineral ettringite ($Ca_6Al_2(SO_4)_3(OH)_{12}.26H_2O$) that will precipitate onto the $Ca_3O_5Si$ surfaces preventing further rapid hydration (flash-set). The gypsum is gradually consumed and ettringite continues to precipitate until all the gypsum is consumed. The sulphates ion concentration will decrease and the ettringite will become unstable converting to calcium monosulphoaluminate hydrate ($Ca_4Al_2O_6(SO_4).14H_2O$). The remaining unhydrated $Ca_3O_5Si$ will form calcium aluminate hydrate. Cement slurry design is based on the altering or inhibition of the hydration reactions with specific additives.

The cured cement may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, and combinations of these. The cement precursor material may include Portland cement, siliceous fly ash, calcareous fly ash, slag cement, silica fume, any known cement precursor material or combinations of any of these.

In some embodiments, the carbon nanotube sponges are randomly dispersed throughout the cured cement. The carbon nanotube sponges may be dispersed into the cement through a variety of methods including but not limited to sonication, the exchange of superacids with surfactant, or sacrificial templating. In embodiments, the superacids may include chlorosulfuric acid, triflic acid, oleum, fluorosulfuric acid, carborane acid, fluoroantimonic acid, or combinations of these. Dispersing the carbon nanotube sponges via sonication may include agitating the carbon nanotube sponges in an aqueous phase with a dispersing agent. The dispersing agent may be any of the dispersing agents previously described. Dispersing the carbon nanotube sponges via sacrificial templating may include adding particles including carbon nanotube sponges disposed on sacrificial templates to a cement slurry and allowing the sacrificial templates to disintegrate thereby leaving the carbon nanotube sponges dispersed throughout the cement slurry.

The carbon nanotube sponges include a three dimensional interconnected framework of carbon nanotubes. These carbon nanotubes include at least one of single-walled nanotubes, double-walled nanotubes, multi-walled nanotubes, narrow-walled nanotubes, or bundle of nanotubes. The carbon nanotubes may have a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm.

The carbon nanotubes may have a length of from 20 to 500 μm, 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm.

An aspect ratio is the length of a substance divided by the width, or diameter. The carbon nanotubes may have an aspect ratio of from 100 to 100,000, from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000.

The carbon nanotubes may have a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The multi-walled carbon nanotubes may include a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 1 grams per cubic centimeter ($g/cm^3$), from 0.001 to 0.12 $g/cm^3$, from 0.01 to 0.08 $g/cm^3$, from 0.02 to 0.06 $g/cm^3$, from 0.01 to 1 $g/cm^3$, from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

In some embodiments, the carbon nanotube sponges may be boron-doped, and therefore may include boron. Boron-doped carbon nanotube sponges may have decreased conductivity as compared to carbon nanotube sponges that do not include boron. However, these boron-doped carbon nanotube sponges may have increased dendritic growth within the three dimensional interconnected framework of boron-doped carbon nanotubes. Specifically, the boron-doped carbon nanotube sponges may have decreased porosity as compared to the carbon nanotube sponges. The boron-doped carbon nanotube sponges may have a porosity of from 20 to 99%, from 20% to 95%, from 20% to 90%, from 20% to 75%, from 20% to 60%, from 20% to 50%, from 20% to 40%, from 20% to 30%, from 30% to 95%, from 30% to 90%, from 30% to 75%, from 30% to 60%, from 30% to 50%, from 30% to 40%, from 40% to 95%, from 40% to 90%, from 40% to 75%, from 40% to 60%, from 40% to 50%, from 50% to 95%, from 50% to 90%, from 50% to 75%, from 50% to 60%, from 60% to 95%, from 60% to 90%, from 60% to 75%, from 75% to 95%, from 75% to 90%, from 90% to 95%, from 95% to 99%, from 95% to 97%, from 97% to 99%, from 97% to 98%, or from 98% to 99%.

The cured cement may have a reduced density as compared to conventional cements, due to the presence of the carbon nanotube sponges. The cured cement may have a density of from 5 to 20 pounds per gallon (ppg), from 5 to 17 ppg, from 5 to 15 ppg, from 5 to 13 ppg, from 5 to 10 ppg, from 7 to 20 ppg, from 7 to 17 ppg, from 7 to 15 ppg, from 7 to 13 ppg, from 7 to 10 ppg, from 10 to 20 ppg, from 10 to 17 ppg, from 10 to 15 ppg, from 10 to 13 ppg, from 13 to 20 ppg, from 13 to 17 ppg, from 13 to 15 ppg, or of 13 ppg.

An elastic modulus measures a material's resistance to being deformed elastically, or non-permanently, when a stress is applied to it. The elastic modulus of an object is defined as the slope of its stress-strain curve in the elastic deformation region. A stiffer material will have a greater elastic modulus than a material that is more deformable. The equation for an elastic modulus has the generic form:

$$\lambda = \frac{\text{stress}}{\text{strain}} \qquad \text{EQUATION 1}$$

where stress is the force causing the deformation divided by the area to which the force is applied and strain is the ratio of the change in some parameter caused by the deformation to the original value of the parameter. The cured cement of the present disclosure may have a reduced elastic modulus as compared to conventional cured cements. The cured cement may have an elastic modulus of from 1,000 to 10,000 MPa, 1,000 to 8,000 MPa, 1,000 to 5,000 MPa, 1,000 to 2,000 MPa, 2,000 to 10,000 MPa, 2,000 to 8,000 MPa, 2,000 to 5,000 MPa, 5,000 to 10,000 MPa, 5,000 to 8,000 MPa, or 8,000 to 10,000 MPa.

The carbon nanotube sponges are capable of conducting electric energy. When an external mechanical force is applied to the cured cement, the carbon nanotube sponges may deform, and the conductivity of the carbon nanotube sponges may increase. The conductivity of the carbon nanotube sponges may increase by 5%, by 10%, by 25%, by 50%, by 75%, by 100%, by 125%, by 150%, by 175%, by 200%, by 250%, or by 300% compared to when the mechanical force is not applied. The carbon nanotube sponges may have a conductivity of from 0.01 to 20 ohm meters ($\Omega \cdot m$), 0.01 to 10 $\Omega \cdot m$, 0.01 to 5 $\Omega \cdot m$, 0.01 to 2 $\Omega \cdot m$, 0.01 to 1 $\Omega \cdot m$, 1 to 20 $\Omega \cdot m$, 1 to 10 $\Omega \cdot m$, 1 to 5 $\Omega \cdot m$, 1 to 2 $\Omega \cdot m$, 2 to 20 $\Omega \cdot m$, 2 to 10 $\Omega \cdot m$, 2 to 5 $\Omega \cdot m$, 5 to 20 $\Omega \cdot m$, 5 to 10 $\Omega \cdot m$, or 10 to 20 $\Omega \cdot m$ before a mechanical force is applied. The conductivity of the carbon nanotube sponges may increase by 1% to 5000%, 1% to 3000%, 1% to 1000%, 1% to 500%, 1% to 100%, 1% to 50%, 1% to 25%, 1% to 10%, 1% to 5%, 10% to 5000%, 10% to 3000%, 10% to 1000%, 10% to 500%, 10% to 100%, 10% to 50%, 10% to 25%, 100% to 5000%, 100% to 3000%, 100% to 1000%, 100% to 500%, 1000% to 5000%, 1000% to 3000%, or 3000% to 5000% after a mechanical force is applied.

As previously stated, the cured cement may further include conductive fibers. These conductive fibers may include any substance with an aspect ratio of greater than 1 that is capable of conducting electrical current. Specifically, the conductive fibers may include carbon nanotubes. The conductive fibers include electrically conductive elements. These electrically conductive elements may include at least one of carbon, nickel, copper, gold, silver, or titanium. These conductive fibers interconnect the carbon nanotube sponges and form a conductive web within the cured cement. Therefore, when an external load is applied to the cement, the cured cement is capable of conducting electric current. In some applications, this may include conducting an electric current from a power source to sensors embedded throughout the wellbore, and then conducting an electric current from the sensors to a computing device.

As a result of this conductive web within the cured cement, the cured cement of the present disclosure may have a reduced bulk resistance as compared to conventional cured cements. The cured cement may have a bulk resistance of from 10 to 500 ohm meters ($\Omega \cdot m$), 10 to 400 $\Omega \cdot m$, 10 to 300 $\Omega \cdot m$, 10 to 200 $\Omega \cdot m$, 10 to 100 $\Omega \cdot m$, 10 to 50 $\Omega \cdot m$, 50 to 500 $\Omega \cdot m$, 50 to 400 $\Omega \cdot m$, 50 to 300 $\Omega \cdot m$, 50 to 200 $\Omega \cdot m$, 50 to 100 $\Omega \cdot m$, 100 to 500 $\Omega \cdot m$, 100 to 400 $\Omega \cdot m$, 100 to 300 $\Omega \cdot m$, 100 to 200 $\Omega \cdot m$, 200 to 500 $\Omega \cdot m$, 200 to 400 $\Omega \cdot m$, 200 to 300 $\Omega \cdot m$, 300 to 500 $\Omega \cdot m$, 300 to 400 $\Omega \cdot m$, or 400 to 500 $\Omega \cdot m$. Furthermore, when an external mechanical load is applied to the cured cement, the carbon nanotube sponges may deform, and the bulk resistance of the cured cement may decrease. The bulk resistance of the cured cement may decrease by from 0.1% to 200%, from 0.1% to 150%, from 0.1% to 100%, from 0.1% to 75%, from 0.1% to 50%, from 0.1% to 25%, from 0.1% to 10%, from 0.1% to 5%, from 0.1% to 1%, from 1% to 200%, from 1% to 150%, from 1% to 100%, from 1% to 75%, from 1% to 50%, from 1% to 25%, from 1% to 10%, from 1% to 5%, from 5% to 200%, from 5% to 150%, from 5% to 100%, from 5% to 75%, from 5% to 50%, from 5% to 25%, from 5% to 10%, from 10% to 200%, from 10% to 150%, from 10% to 100%, from 10% to 75%, from 10% to 50%, from 10% to 25%, from 25% to 200%, from 25% to 150%, from 25% to 100%, from 25% to 75%, from 25% to 50%, from 50% to 200%, from 50% to 150%, from 50% to 100%, from 50% to 75%, from 75% to 200%, from 75% to 150%, from 75% to 100%, from 100% to 200%, from 100% to 150%, or from 150% to 200% compared to when the mechanical force is not applied.

Carbon nanotube sponges are synthesized by chemical vapor deposition, in which nanotubes are self-assembled into a three-dimensionally interconnected framework. The carbon nanotube sponges are hydrophobic, and can be elastically and reversibly deformed into any shape. The carbon nanotube sponges may have a porosity of from 20 to 99%, from 20% to 95%, from 20% to 90%, from 20% to 75%, from 20% to 60%, from 20% to 50%, from 20% to 40%, from 20% to 30%, from 30% to 95%, from 30% to 90%, from 30% to 75%, from 30% to 60%, from 30% to 50%, from 30% to 40%, from 40% to 95%, from 40% to 90%, from 40% to 75%, from 40% to 60%, from 40% to 50%, from 50% to 95%, from 50% to 90%, from 50% to 75%, from 50% to 60%, from 60% to 95%, from 60% to 90%, from 60% to 75%, from 75% to 95%, from 75% to 90%, from 90% to 95%, from 95% to 99%, from 95% to 97%, from 97% to 99%, from 97% to 98%, or from 98% to 99%. The carbon nanotube sponges may further include at least one of boron, nitrogen, or sulfur. In some embodiments, the carbon nanotube sponges further include boron.

The carbon nanotube sponges may be functionalized with carbon nanotubes. The carbon nanotube sponges may be functionalized with carbon nanotubes via chemical vapor deposition. Functionalizing the carbon nanotube sponges with carbon nanotubes may include synthesizing carbon nanotubes on the carbon nanotube sponges. Synthesizing carbon nanotubes on the carbon nanotube sponges may include heating the carbon nanotube sponges to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, this may include placing the carbon nanotube sponges into an oven or a reactor. In some embodiments, synthesizing the carbon nanotubes may include placing in the oven carbon precursors, which vaporize as the oven heats, to form the functionalized carbon nanotube sponges. In other embodiments, synthesizing the carbon nanotubes may include flowing a gas mixture over the carbon nanotube sponges to form the functionalized carbon nanotube sponges. In some embodiments, the gas mixture may include argon, hydrogen, benzene, ethylene, propylene, butylene, methylnaphthalene, toluene, xylene, graphite, acetylene, ethanol, methane, carbon monoxide, carbon dioxide, hydrocarbon gases, any other gas containing carbon, and combinations of these. Specifically, in one embodiment, the gas mixture may include argon, hydrogen, and ethylene.

In some embodiments, heating the carbon nanotube sponges includes flowing a gas mixture over the carbon nanotube sponges with a heating rate of from 1° C. per minute (° C./min.) to 20° C./min., from 3° C./min. to 10° C./min., from 5° C./min. to 10° C./min., from 5° C./min. to 7° C./min., or of 5° C./min. until the carbon nanotube sponges are heated to ranges disclosed previously, and adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % carbon-based gas, as calculated by a volume of the gas mixture, to the gas mixture, and flowing the gas mixture over the carbon nanotube sponges to form the functionalized carbon nanotube sponges. The carbon-based gas may include any gas that includes carbon, such as, as nonlimiting examples, carbon dioxide or hydrocarbon gases. In some embodiments, the carbon-based gas may be ethylene. The gas mixture including argon, hydrogen, and ethylene may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 400 to 1000 milliliter per minute (ml/min.), from 500 to 800 ml/min., from 600 to 800 ml/min., or at 700 ml/min.

Embodiments of the disclosure also relate to cement slurries. The cement slurry of the present disclosure may include water, a cement precursor material, and carbon nanotube sponges. The cement slurry may further include conductive fibers, as previously described. The cement precursor material may be any material which, when mixed with water, can be cured into a cement. The cement precursor material may be a hydraulic or a non-hydraulic cement precursor. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, and combinations of these. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

Water may be added to the cement precursor material to produce the slurry. The water may be distilled water, deionized water, or tap water. In some embodiments, the water may contain additives or contaminants. The water may include freshwater, seawater, formation water, produced water, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Salts may include, but are not limited to, alkali metal chlorides, hydroxides, or carboxylates. In some embodiments, salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 10 wt. % to 70 wt. % by weight of cement precursor (BWOC) water. In some embodiments, the cement slurry may contain from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The cement slurry may contain 30 wt. % BWOC water.

Along with the cement precursor material and water, the cement slurry may further include carbon nanotube sponges and conductive fibers. These carbon nanotube sponges and conductive fibers may increase the electrical conductivity of the cement slurry.

In some embodiments, the cement slurry may contain at least one additive other than the carbon nanotube sponges and the conductive fibers. As non-limiting examples, the additives may include accelerators, retarders, extenders, suspending agents, weighting agents, fluid loss control agents, lost circulation control agents, surfactants, antifoaming agents, and combinations of these. The suspending agents may include at least one of a copolymer of N,N-Dimethylacrylamide and sodium 2-acrylamido-2-methyl propane sulfonate, and hydroxyethyl cellulose.

In some embodiments, the cement slurry may contain from 0.1 to 10% BWOC of the one or more additives based on the total weight of the cement slurry. The cement slurry may contain from 0.1 to 8% BWOC of the one or more additives, from 0.1 to 5% BWOC of the one or more additives, or from 0.1 to 3% BWOC of the one or more additives. The cement slurry may contain from 1 to 10% BWOC of the one or more additives, from 1 to 8% BWOC, from 1 to 5% BWOC, or from 1 to 3% BWOC of the one or more additives. In some embodiments, the cement slurry may contain from 3 to 5% BWOC, from 3 to 8% BWOC, from 3 to 10% BWOC, or from 5 to 10% BWOC of the one or more additives.

In some embodiments, the additives may include a dispersant containing one or more anionic groups. The dispersant may include synthetic sulfonated polymers, lignosulfonates with carboxylate groups, organic acids, hydroxylated sugars, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability.

In some embodiments, the additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the cement slurry and may, in some embodiments, cause additional retardation effects.

In some embodiments, the cement slurry may contain from 0.1% BWOC to 10% BWOC of one or more fluid loss additives, the one or more dispersants, or both. The cement slurry may contain from 0.02 to 90 pound per barrel (lb/bbl) of the fluid loss additives, the one or more dispersants, or both based on the total weight of the cement slurry. The cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

Embodiments of the disclosure also relate to methods of producing the cement slurries previously described. The method of making modified cement slurries may include adding particles including carbon nanotube sponges disposed on sacrificial templates to a cement slurry to form the modified cement slurry and allowing the sacrificial templates to disintegrate, thereby leaving the carbon nanotube sponges dispersed throughout the modified cement slurry. The carbon nanotube sponges may be in accordance with any of the embodiments previous described, and may be randomly dispersed throughout the modified cement slurry.

The sacrificial templates may include at least one of silica, polylactic acid, glass, and polygluconic acid. In some embodiments, the sacrificial templates include silica. The solubility of silica may increase at pH of greater than 7.8. The cement slurry may have a pH of greater than 7, 7.5, 7.8, 7.9, 8, 8.5, 9, 9.5, 10, 10.5, 11, 11.5, 12, 12.5, 13, 13.5, or 14. The cement slurry may have a pH of greater than 7 and disintegrate the sacrificial templates through acid etching. Acid etching involves using a strong acid to dissolve a substance. By acid etching the sacrificial templates, carbon nanotube sponges may be left dispersed throughout the cement slurry, in approximately the same placement and orientation they were in before the sacrificial templates dissolved. This results in carbon nanotube sponges dispersed throughout the modified cement slurry, and no clumps of carbon nanotube sponges, as would be formed by adding carbon nanotube sponges into the cement slurry by conventional methods. Therefore, upon curing, the carbon nanotube sponges would likewise be dispersed throughout the cured cement, resulting in more efficient and effective electrical conductivity.

Current methods of adding carbon nanotube sponges to cement slurries result in clumps within the cement slurry, as carbon nanotubes are conventionally added to the cement slurry as a batch. Cement slurries or cured cements with groups of clumped carbon nanotubes do not conduct electrical current as effectively as cement slurries or cured cements with dispersed carbon nanotubes. Although various techniques have been used to try to disperse clumped carbon nanotube sponges, such as ultra-sonication, or adding surfactants or polymers into the cement slurry, none have resulted in dispersed carbon nanotube sponges, as are achieved by the sacrificial template method.

The cement slurry may be hydraulic, as previously described. In other embodiments, the cement slurry is non-hydraulic, and previously described. In some embodiments, the cement slurry includes at least one of Portland cement, siliceous fly ash, calcareous fly ash, slag cement, silica fume, calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, calcium aluminate, and combinations of these, as previously described.

The method may further include treating the particles with a surfactant and freeze drying the treated particles prior to adding the particles to the cement slurry. Treating the particles with a surfactant and freeze drying the treated particles may assist in dispersing the particles within the cement slurry. The surfactant may include at least one of anionic surfactants, cationic surfactants, amphoteric surfactants, zwitterionic surfactants, nonionic surfactants, or combinations of these.

In some embodiments, the method for producing a modified cement slurry may further include mixing water with a cement precursor material, to produce the cement slurry. The water and cement precursor material may be in accordance with any of the embodiments previously described.

Furthermore, the method may include adding at least one of a dispersing agent or a surfactant to the cement slurry prior to adding the particles to the cement slurry. In other embodiments the method may further include adding at least one of a dispersing agent or a surfactant to the modified cement slurry after adding the particles to the cement slurry. The dispersing agent may include polycarboxylate ether (such as a copolymer of (meth)acrylate, (meth)acryl sulfonate, and monoacrylate ester of polyethylene glycol alkyl ether or monoacrylate ester of polypropylene glycol alkyl ether). Other dispersants which may be used are sulfonated polymers (such as sulfonated lignin, sulfonated isobutylene maleic anhydride copolymers, sulfonated polystyrene-maleic anhydride), sulfonated alkylketone amine condensation products (such as acetone-melamine condensates) and sulfonated aromatic-formaldehyde condensation products (such as melamine-formaldehyde condensates, sulfonated naphthalene-formaldehyde condensates, and sulfonated phenol-formaldehyde condensates). In some embodiments, the dispersing agent may contain one or more anionic groups. The dispersing agent may include synthetic sulfonated polymers, lignosulfonates with carboxylate groups, organic acids, hydroxylated sugars, or combinations of any of these. Without being bound by any particular theory, in some embodiments, the anionic groups on the dispersing agent may be adsorbed on the surface of the cement particles to impart a negative charge to the cement slurry. The electrostatic repulsion of the negatively charged cement particles may allow the cement slurry to be dispersed and more fluid-like, improving flowability. This may allow for reduced friction pressure during pumping or reduced fluid loss in the subsurface formation as compared to a conventional cement slurry without a dispersing agent.

As described previously, the surfactant may include at least one of anionic surfactants, cationic surfactants, amphoteric surfactants, zwitterionic surfactants, nonionic surfactants, or combinations of these.

The cement slurry may include one or more additives, including but not limited to defoamers, dispersants, and fluid loss additives. The mixing step, in some embodiments, may involve shearing the water, cement precursor material, carbon nanotube sponges, and conductive fibers, and, optionally, other additives. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \qquad \text{EQUATION 2}$$

where
E=Mixing energy (kJ)
M=Mass of slurry (kg)
k=6.1×10$^{-8}$ m$^5$/s (constant found experimentally)
ω=Rotational speed (radians/s)
t=Mixing time (s)
V=Slurry volume (m$^3$)

The modified cement slurry may be capable of conducting electric current, as previously described with respect to the cured cement.

Further embodiments of the present disclosure relate to methods of using the cement slurries previously described. In some embodiments, the method may include pumping the cement slurry into a location to be cemented and curing the cement slurry by allowing the water and the cement precursor material to react. The location to be cemented may be a well, a wellbore, or an annulus.

Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there, the cement slurry fills in the space between the casing and the wellbore wall, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before pumping the cement into the hole.

In some embodiments, curing the cement slurry may refer to passively allowing time to pass under conditions upon which the cement slurry may harden or cure through allowing one or more reactions between the water and the cement precursor material. In some embodiments, curing conditions may be ambient conditions. Curing may also involve actively hardening or curing the cement slurry by introducing a curing agent to the cement slurry, providing heat or air to the cement slurry, manipulating the environmental conditions of the cement slurry to facilitate reactions between the water and the cement precursor, or a combination of these. Usually, the cement will be cured and convert from liquid to solid due to subsurface formation conditions, temperature, and pressure. In the laboratory, a curing chamber capable of applying temperature and pressure is used for curing the cement specimens at required conditions. Cylindrical molds (2" diameter and 5" length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., greater than or equal to 120° F., or greater than or equal to 180° F. The cement slurry may be cured at temperatures of from 50° F. to 250° F., or from 50° F. to 200° F., or from 50° F. to 150° F., or from 50° F. to 120° F., or from 50° F. to 180° F. In some instances, the temperature may be as great as 200° F., 300° F., 400° F., or 500° F. The cement slurry may be cured at pressures of greater than or equal to 20 pounds per square inch (psi), greater than or equal to 200 psi, greater than or equal to 500 psi, greater than or equal to 1000 psi, greater than or equal to 2000 psi, or greater than or equal to 3000 psi. The cement slurry may be cured at pressures of from 20 psi to 5000 psi, or from 200 psi to 5000 psi, or from 200 psi to 3000 psi, or from 500 psi to 2000 psi, or from 500 psi to 3000 psi. In some instances, the pressure may be as great as 1000 psi, 2000 psi, 3000 psi, 5000 psi, or 10000 psi. The cement slurry may be cured for from 1 day to 14 days, such as from 3 to 14 days, or from 5 to 14 days, or from 7 to 14 days, or from 1 to 4 days, or from 4 to 7 days.

Embodiments of the disclosure also relate to methods of producing cured cements. The method may include combining water with a cement precursor material, carbon nanotube sponges, and conductive fibers to form a cement slurry. The cement slurry may be in accordance with any of the embodiments previously described. The method may include curing the cement slurry by allowing for a reaction between the water and the cement precursor material to produce cured cement. The curing step may be in accordance with any of the embodiments previously described.

Further embodiments of the present disclosure relate to particular methods of cementing a casing in a wellbore. The method may include pumping a cement slurry into an annulus between a casing and a wellbore and curing the cement slurry. The cement slurry may be in accordance with any of the embodiments previously described. Likewise, curing the cement slurry may be in accordance with any of the embodiments previously described. Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there it fills in the space between the casing and the wellbore wall, and hardens. This creates a seal so that outside materials cannot enter the well flow, as well as permanently positions the casing in place.

In some embodiments, the cement slurry may contain water and may be water-based. As such, the cement slurry may be hydrophilic, forming stronger bonds with water-wet surfaces. Well sections drilled with non-aqueous drilling fluids may have oil-wet surfaces, resulting in poor bonding between the well and the cement slurry, as oil and water naturally repel. Poor bonding may lead to poor isolation and a buildup of unwanted casing-casing or tubing-casing annular pressure. Without being bound by theory, it is desirable to make the subsurface formation or casing water wet to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

The description of the embodiments is illustrative in nature and is in no way intended to be limiting it its application or use. As used throughout this disclosure, the singular forms "a," "an" and "the" include plural references unless the context clearly dictates otherwise. Thus, for example, reference to "a" component includes aspects having two or more such components, unless the context clearly indicates otherwise.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

The presently described subject matter may include one or more aspects, which should not be regarded as limiting on the teachings of the present disclosure. A first aspect may include a method of making a modified cement slurry comprising: adding particles comprising carbon nanotube sponges disposed on sacrificial templates to a cement slurry to form the modified cement slurry; and allowing the sacrificial templates to disintegrate, thereby leaving the carbon nanotube sponges dispersed throughout the modified cement slurry.

A second aspect may include a method of making a modified cement slurry comprising: synthesizing carbon nanotube sponges via chemical vapor deposition on sacrificial templates to form particles; adding the particles to a cement slurry to form the modified cement slurry; and allowing the sacrificial templates to disintegrate, thereby leaving the carbon nanotube sponges dispersed throughout the modified cement slurry.

Another aspect may include any of the previous aspects, further comprising treating the particles with an aqueous surfactant and freeze drying the treated particles prior to adding the particles to the cement slurry.

Another aspect may include any of the previous aspects, further comprising adding at least one of a dispersing agent or a surfactant to the cement slurry prior to adding the particles to the cement slurry.

Another aspect may include any of the previous aspects, in which the dispersing agent comprises polycarboxylate ether.

Another aspect may include any of the previous aspects, in which the surfactant comprises at least one of anionic surfactants, cationic surfactants, amphoteric surfactants, zwitterionic surfactants, nonionic surfactants, or combinations of these.

Another aspect may include any of the previous aspects, in which the sacrificial templates comprise at least one of silica, polylactic acid, glass, and polygluconic acid.

Another aspect may include any of the previous aspects, in which the sacrificial templates comprise silica.

Another aspect may include any of the previous aspects, in which the carbon nanotube sponges are functionalized with carbon nanotubes.

Another aspect may include any of the previous aspects, in which the carbon nanotube sponges store electric energy.

Another aspect may include any of the previous aspects, in which the carbon nanotube sponges are randomly dispersed throughout the cement slurry.

Another aspect may include any of the previous aspects, in which the cement slurry has a pH of greater than 7 and disintegrates the sacrificial templates through acid etching.

Another aspect may include any of the previous aspects, in which the cement slurry is hydraulic.

Another aspect may include any of the previous aspects, in which the cement slurry is non-hydraulic.

Another aspect may include any of the previous aspects, in which the cement slurry comprises at least one of Portland cement, siliceous fly ash, calcareous fly ash, slag cement, silica fume, calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, calcium aluminate, and combinations of these.

Another aspect may include any of the previous aspects, further comprising treating the particles with an aqueous surfactant and freeze drying the treated particles prior to adding the particles to the cement slurry.

Another aspect may include any of the previous aspects, further comprising adding at least one of a dispersing agent or a surfactant to the cement slurry prior to adding the particles to the cement slurry.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

What is claimed is:

1. A method of making a modified cement slurry comprising:
   adding particles comprising carbon nanotube sponges disposed on sacrificial templates to a cement slurry to form the modified cement slurry; and
   allowing the sacrificial templates to disintegrate, thereby leaving the carbon nanotube sponges dispersed throughout the modified cement slurry.

2. The method of claim 1, further comprising treating the particles with an aqueous surfactant and freeze drying the treated particles prior to adding the particles to the cement slurry.

3. The method of claim 1, further comprising adding at least one of a dispersing agent or a surfactant to the cement slurry prior to adding the particles to the cement slurry.

4. The method of claim 3, in which the dispersing agent comprises polycarboxylate ether.

5. The method of claim 3, in which the surfactant comprises at least one of anionic surfactants, cationic surfactants, amphoteric surfactants, zwitterionic surfactants, non-ionic surfactants, or combinations of these.

6. The method of claim 1, in which the sacrificial templates comprise at least one of silica, polylactic acid, glass, and polygluconic acid.

7. The method of claim 1, in which the sacrificial templates comprise silica.

8. The method of claim 1, in which the carbon nanotube sponges are functionalized with carbon nanotubes.

9. The method of claim 1, in which the carbon nanotube sponges store electric energy.

10. The method of claim 1, in which the carbon nanotube sponges are randomly dispersed throughout the cement slurry.

11. The method of claim 1, in which the cement slurry has a pH of greater than 7 and disintegrates the sacrificial templates through acid etching.

12. The method of claim 1, in which the cement slurry is hydraulic.

13. The method of claim 1, in which the cement slurry is non-hydraulic.

14. The method of claim 1, in which the cement slurry comprises at least one of Portland cement, siliceous fly ash, calcareous fly ash, slag cement, silica fume, calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, calcium aluminate, and combinations of these.

15. A method of making a modified cement slurry comprising:
    synthesizing carbon nanotube sponges via chemical vapor deposition on sacrificial templates to form particles;
    adding the particles to a cement slurry to form the modified cement slurry; and
    allowing the sacrificial templates to disintegrate, thereby leaving the carbon nanotube sponges dispersed throughout the modified cement slurry.

16. The method of claim 15, further comprising treating the particles with an aqueous surfactant and freeze drying the treated particles prior to adding the particles to the cement slurry.

17. The method of claim 15, further comprising adding at least one of a dispersing agent or a surfactant to the cement slurry prior to adding the particles to the cement slurry.

18. The method of claim 17, in which the dispersing agent comprises polycarboxylate ether.

19. The method of claim 15, in which the sacrificial templates comprise at least one of silica, polylactic acid, glass, and polygluconic acid.

20. The method of claim 15, in which the cement slurry has a pH of greater than 7 and disintegrates the sacrificial templates through acid etching.

* * * * *